United States Patent
Egami et al.

(10) Patent No.: US 12,134,563 B2
(45) Date of Patent: Nov. 5, 2024

(54) POROUS SILICA PARTICLES AND METHOD FOR PRODUCING SAME

(71) Applicant: JGC CATALYSTS AND CHEMICALS LTD., Kanagawa (JP)

(72) Inventors: Miki Egami, Kitakyushu (JP); Takuji Miyamoto, Kitakyushu (JP); Ryo Muraguchi, Kitakyushu (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 1165 days.

(21) Appl. No.: 16/954,765

(22) PCT Filed: Dec. 27, 2018

(86) PCT No.: PCT/JP2018/048127
§ 371 (c)(1),
(2) Date: Jun. 17, 2020

(87) PCT Pub. No.: WO2019/131873
PCT Pub. Date: Jul. 4, 2019

(65) Prior Publication Data
US 2021/0094835 A1    Apr. 1, 2021

(30) Foreign Application Priority Data
Dec. 27, 2017 (JP) ................ 2017-251737

(51) Int. Cl.
*C01B 33/18* (2006.01)

(52) U.S. Cl.
CPC .......... *C01B 33/18* (2013.01); *C01P 2004/32* (2013.01); *C01P 2006/12* (2013.01);
(Continued)

(58) Field of Classification Search
CPC .............. C01P 2006/12; C01P 2006/14; C01P 2006/16; C01P 2006/90; C01P 2004/32; C01B 33/18
See application file for complete search history.

(56) References Cited

U.S. PATENT DOCUMENTS

| 4,225,464 A | 9/1980 | Scholten et al. |
|---|---|---|
| 7,101,523 B2 | 9/2006 | Mori et al. |

(Continued)

FOREIGN PATENT DOCUMENTS

| CN | 1408641 A | 4/2003 |
|---|---|---|
| CN | 102656119 A | 9/2012 |

(Continued)

OTHER PUBLICATIONS

JP2010138021 which is published as JP5253124 (see machine translation), Jun. 2010—Egami et al.*

(Continued)

*Primary Examiner* — Smita S Patel
(74) *Attorney, Agent, or Firm* — Pearne & Gordon LLP

(57) ABSTRACT

A porous silica particle has disintegration properties. The porous silica particle has an average particle diameter of 0.5 to 50 μm, a pore volume of 0.5 to 5.0 cm$^3$/g, a mode of a pore diameter of 2 to 50 nm, a shape factor of 0.8 to 1.0, an average compression strength of 0.1 to less than 1.0 kgf/mm$^2$, a sodium content of 10 ppm or less, and a network structure.

4 Claims, 2 Drawing Sheets

(52) U.S. Cl.
CPC ...... *C01P 2006/14* (2013.01); *C01P 2006/16* (2013.01); *C01P 2006/90* (2013.01)

(56) References Cited

U.S. PATENT DOCUMENTS

| | | | |
|---|---|---|---|
| 8,889,044 | B2 | 11/2014 | Yano et al. |
| 9,000,202 | B2 | 4/2015 | Maehara et al. |
| 9,079,777 | B2 | 7/2015 | Maehara et al. |
| 9,808,407 | B2 | 11/2017 | Enomoto et al. |
| 10,143,636 | B2 | 12/2018 | Watanabe et al. |
| 10,358,353 | B2 | 7/2019 | Muraguchi et al. |
| 10,472,483 | B2 | 11/2019 | Haruta et al. |
| 10,815,355 | B2 | 10/2020 | Haruta et al. |
| 2005/0047985 | A1 | 3/2005 | Mori et al. |
| 2010/0146864 | A1 | 6/2010 | Nakayama et al. |
| 2012/0256336 | A1 | 10/2012 | Yano et al. |
| 2012/0308824 | A1 | 12/2012 | Matsukubo et al. |
| 2012/0323030 | A1 | 12/2012 | Maehara et al. |
| 2015/0056119 | A1 | 2/2015 | Maehara et al. |
| 2016/0159654 | A1 | 6/2016 | Muraguchi et al. |
| 2017/0135920 | A1 | 5/2017 | Enomoto et al. |
| 2017/0312196 | A1 | 11/2017 | Watanabe et al. |
| 2017/0342232 | A1 | 11/2017 | Haruta et al. |
| 2019/0330438 | A1 | 10/2019 | Haruta et al. |

FOREIGN PATENT DOCUMENTS

| | | | | |
|---|---|---|---|---|
| CN | 102725230 | A | 10/2012 | |
| CN | 102762498 | A | 10/2012 | |
| CN | 105408252 | A | 3/2016 | |
| CN | 106660812 | A | 5/2017 | |
| CN | 106794995 | A | 5/2017 | |
| CN | 107108944 | A | 8/2017 | |
| EP | 2228344 | A1 * | 9/2010 | ............ A61K 8/025 |
| JP | S54-021992 | A | 2/1979 | |
| JP | H0261406 | A | 3/1990 | |
| JP | H02-061406 | B2 | 12/1990 | |
| JP | 2000-012314 | A | 1/2000 | |
| JP | 2003-133267 | A | 5/2003 | |
| JP | 2003-226516 | A | 8/2003 | |
| JP | 2003-238142 | A | 8/2003 | |
| JP | 2005-022894 | A | 1/2005 | |
| JP | 2010-064218 | A | 3/2010 | |
| JP | 2010-138021 | A | 6/2010 | |
| JP | 2013-032276 | A | 2/2013 | |
| JP | 5253124 | B2 | 7/2013 | |
| JP | 2018177620 | A | 11/2018 | |
| WO | 2016/002797 | A1 | 1/2016 | |

OTHER PUBLICATIONS

Hiroki et al (JP2010155750, machine translation), published Jul. 15, 2010.*

Hiroshi et al (JP 2005022894 A, machine translation), published Jan. 27, 2005.*

International Search Report dated Feb. 26, 2019 filed in PCT/JP2018/048127.

Chinese Office Action issued on Nov. 3, 2022, for the corresponding Chinese Patent Application No. 201880083856.6.

Taiwanese Office Action issued on Nov. 29, 2021 for the corresponding Taiwanese Patent Application No. 107147235.

Japanese Office Action mailed on Jan. 5, 2023, for the corresponding Japanese Patent Application No. 2019-224117.

* cited by examiner

POROUS SILICA PARTICLES AND METHOD FOR PRODUCING SAME

TECHNICAL FIELD

The present invention relates to porous silica particles that are easily disintegrable, and utilized in abrasives, cosmetic materials, or the like. In particular, the present invention relates to porous particles having a network structure which are formed by aggregated silica fine particles.

BACKGROUND ART

Porous particles have been variously studied. Porous silica particles containing an aggregate of spherical silica fine particles (primary particles) exhibiting a particle diameter distribution of a monodisperse phase have been proposed (for example, see PATENT LITERATURE 1). Such porous silica particles have the following characteristics. (1) The porous silica particles have an average particle diameter of 0.5 to 50 μm. (2) The porous silica particles have a specific surface area of 30 to 250 m$^2$/g. (3) The porous silica particles have a pore volume of 0.10 to 0.25 cm$^3$/g. (4) The porous silica particles have a mode of a pore diameter in a pore diameter distribution (X axis: pore diameter, Y axis: value obtained by differentiating pore volume with pore diameter) of 2 to 50 nm. (5) The total pore volume of pores having a diameter within a range of ±25% of the pore diameter mode is 80% or more of entire pore volume. In such porous silica particles, spherical silica fine particles are used as primary particles for ensuring high uniformity of a pore diameter. Also, the porous particles are utilized as a carrier of a catalyst or an adsorbent. Therefore, the porous particles are not premised on disintegration.

Also, a method of producing spherical porous particles containing an aggregate of non-spherical silica particles is known (for example, see PATENT LITERATURE 2). In PATENT LITERATURE 2, silica particles contained in a dispersion is ground in a sand mill, and the dispersion is thereafter spray-dried. Then, the ground particles are used to form porous particles. Therefore, sphericity is high, but pore volume is small. Accordingly, disintegration properties are not sufficient.

Furthermore, it is known that porous silica particles having an average particle diameter of 0.5 to 150 μm are used as an abrasive (abrasive grains) (for example, see PATENT LITERATURE 3). The porous silica particles of PATENT LITERATURE 3 have an average compression strength of 1 to 100 kgf/mm$^2$, and possess pressure disintegration properties.

CITATION LIST

Patent Literature

PATENT LITERATURE 1: Japanese Patent No. 5253124
PATENT LITERATURE 2: JP-B-02-061406
PATENT LITERATURE 3: JP-A-2010-064218

SUMMARY OF THE INVENTION

Problems to be Solved by the Invention

In recent years, it is considered that porous silica particles are used in an abrasive for achieving more precise abrading. The porous silica particles of PATENT LITERATURE 1 are utilized as a carrier of a catalyst or an adsorbent. Therefore, the porous silica particles have high particle breakage strength. The porous particles of PATENT LITERATURE 2 also have low disintegration properties. Therefore, such porous particles are also not suitable for abrading of a semiconductor. The porous silica particles of PATENT LITERATURE 3 have an average compression strength of 1 to 100 kgf/mm$^2$.

In this manner, the known porous silica particles have high particle strength. Therefore, when such porous silica particles are used in a dry abrasive for precise abrading, a substrate (object to be abraded) comes to be scratched. There is need for porous silica particles having disintegration properties higher than the known particles, so as to be used in an abrasive for performing precise abrading, a scrub material of cosmetics, or the like. However, porous silica particles having high disintegration properties are likely to disintegrate during production. Therefore, spherical particles are unlikely to be obtained. For example, when porous silica particles are formed in a spherical shape with primary particles, there is a risk that the shape may not be maintained, leading to the disintegration of the porous silica particles.

Therefore, an object of the present invention is to achieve spherical porous silica particles that do not disintegrate during production and exhibit high disintegration properties (easily disintegrating properties) during use.

Solution to the Problems

Porous silica particles for solving the above-described problems have a network structure, and possess requirements (i) to (vi) below.
 (i) The porous silica particles have an average particle diameter of 0.5 to 50 μm.
 (ii) The porous silica particles have a pore volume of 0.5 to 5.0 cm$^3$/g.
 (iii) The porous silica particles have a mode of a pore diameter of 2 to 50 nm.
 (iv) The porous silica particles have an average shape factor of 0.8 to 1.0.
 (v) The porous silica particles have an average compression strength of 0.1 to less than 1.0 kgf/mm$^2$.
 (vi) The porous silica particles have a sodium content of 10 ppm or less.

Here, particles that form the network structure preferably include non-spherical particles containing a plurality of silica fine particles (primary particles) having an average particle diameter of 5 to 50 nm which binds to each other. In such a case, the non-spherical particles have an average particle diameter of 50 to 500 nm. Further preferably, a ratio ($d_2/d_1$) between an average particle diameter ($d_2$) of non-spherical particles and an average particle diameter ($d_1$) of primary particles is 1.6 to 100, and the particles that form the network structure are chain particles.

Also, the present inventors found that porous particles having favorable disintegration properties can be obtained by using non-spherical particles containing a plurality of silica fine particles (primary particles) which binds to each other, and controlling the properties of a raw material (a dispersion of non-spherical particles) poured in a spray dryer. That is, the production method according to the present invention includes: a dispersion preparation step of dispersing non-spherical silica particles in water to prepare a dispersion of non-spherical particles; a drying step of pouring, in a spray dryer, the dispersion having a viscosity maintained at 8 to 100 mPa·s by shear force applied continuously or intermittently to the dispersion, to granulate spherical silica particles; and a calcination step of calcining the spherical silica particles. Here, in the drying step, the sodium content of solid matter obtained by drying the dispersion poured in the spray dryer is 10 ppm or less. Also, as the non-spherical particles, chain particles having an average particle diameter of 50 to 500 nm are used. The chain particles include, as primary particles, a plurality of silica fine particles having an average particle diameter of 5 to 50 nm which binds to each other.

DESCRIPTION OF THE EMBODIMENTS

Figure 1:
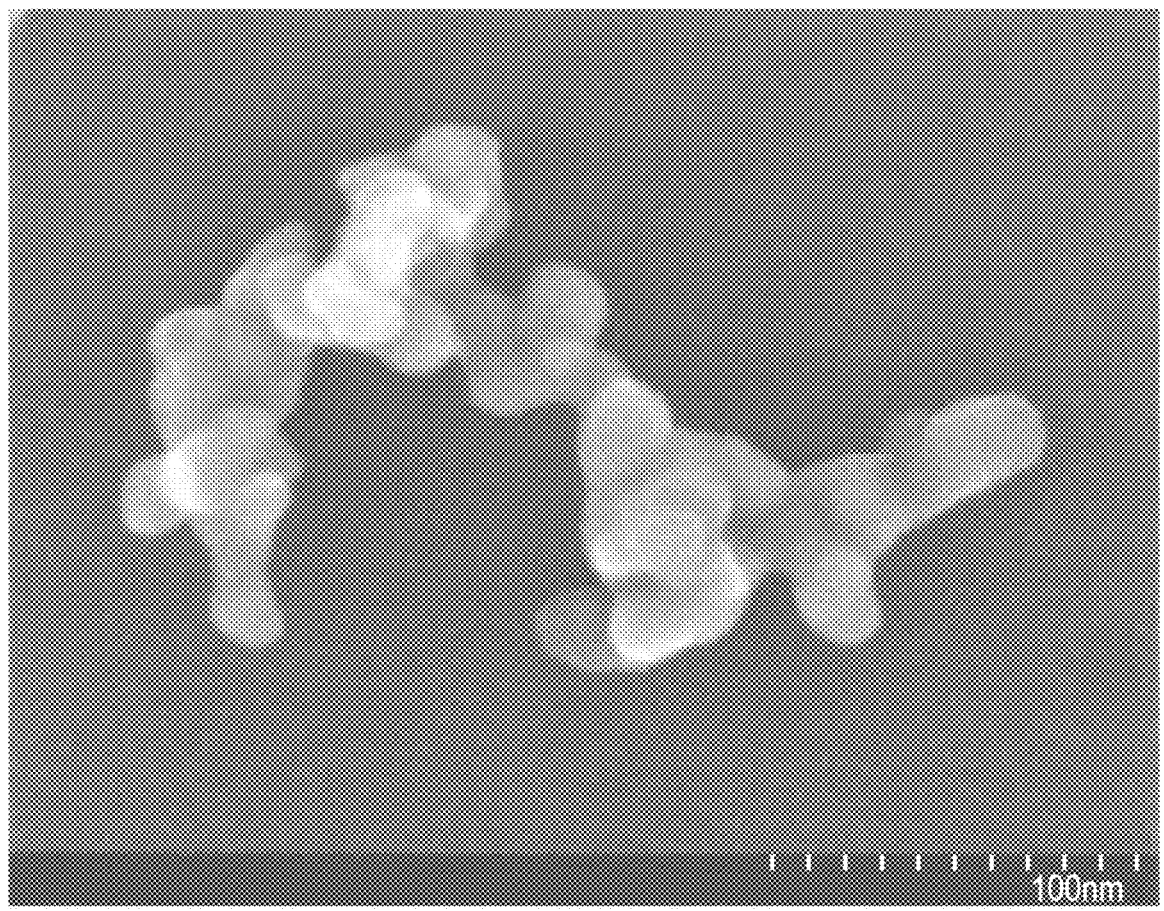
FIG. 1 is an electron micrograph illustrating an example of non-spherical particles.

The porous silica particles according to the present invention have a network structure. Furthermore, the porous silica particles according to the present invention have an average particle diameter of 0.5 to 50 μm, a pore volume of 0.5 to 5.0 cm$^3$/g, a pore diameter mode of 2 to 50 nm, an average shape factor of 0.8 to 1.0, an average compression strength of 0.1 to less than 1.0 kgf/mm$^2$, and a sodium content of 10 ppm or less. Therefore, the porous silica particles do not disintegrate in the production step, and exert high disintegration properties during use.

Here, when the average particle diameter of the porous silica particles exceeds 50 μm, particles having high sphericity are unlikely to be obtained during the production of particles. On the other hand, when this average particle diameter is less than 0.5 μm, powder has low fluidity, which deteriorates workability. The average particle diameter is preferably 1 to 20 μm, more preferably 2 to 15 μm. Such particles are particularly suitable for the use as an abrasive or a cosmetic material.

When the pore volume is less than 0.5 cm$^3$/g, particles are hardened. Therefore, desired disintegration properties cannot be obtained. On the other hand, when the pore volume exceeds 5.0 cm$^3$/g, particles disintegrate during production. Therefore, desired sphericity cannot be obtained. The pore volume is preferably 1.0 to 4.0 cm$^3$/g, more preferably 1.2 to 3.0 cm$^3$/g.

Also, when the mode of a pore diameter is less than 2 nm, particles are hardened. Therefore, desired disintegration properties cannot be obtained. On the other hand, when the mode of a pore diameter exceeds 50 nm, particles disintegrate during production. Therefore, desired sphericity cannot be obtained. The mode of a pore diameter is preferably 5 to 45 nm, more preferably 10 to 45 nm.

From a total pore volume ($V_{\pm 25\%}$) of pores having a diameter within ±25% of the mode, and a pore volume (V), a pore volume rate (%) [$=V_{\pm 25\%}/V \times 100$] can be calculated. This pore volume rate is preferably 40% or more. When the pore volume rate is within this range, a pore diameter distribution is sharp. Therefore, it is inferred that when particles disintegrate, particles that are unlikely to form a lamp finely disintegrate. The pore volume rate is more preferably 40 to 75%.

Also, porous silica particles having an average shape factor of less than 0.8 have unfavorable fluidity, and are therefore not practical. Furthermore, such silica particles vary in the strength in a weight direction. Therefore, the porous silica particles cannot have stable strength. The average shape factor is preferably 0.85 to 1.0, more preferably 0.87 to 1.0.

Also, when the average compression strength is less than 0.1 kgf/mm$^2$, the porous silica particles are likely to disintegrate during production. Therefore, desired particle shape (shape factor or the like) is not obtained. When the average compression strength is 1.0 kgf/mm$^2$ or more, desired disintegration properties are not obtained. The average compression strength is preferably 0.1 to 0.7 kgf/mm$^2$, more preferably 0.1 to 0.4 kgf/mm$^2$.

Also, the sodium content is 10 ppm or less. Sodium causes particles to be fused. Therefore, sodium is desirably not contained in the porous silica particles. When particles constituting the porous silica particles are fused to each other, the porous silica particles are unlikely to disintegrate. As a result, the average compression strength increases. The sodium content is preferably 5 ppm or less.

Furthermore, the specific surface area of the porous silica particles is preferably 30 to 400 m$^2$/g. When the specific surface area is within this range, particles having both easily disintegrating properties and sphericity are likely to be obtained. The specific surface area is more preferably 50 to 300 m$^2$/g, further preferably 70 to 200 m$^2$/g.

Furthermore, the porosity of the porous silica particles is preferably 50 to 92%. When the porosity is within this range, favorable disintegration properties are obtained. The porosity is more preferably 55 to 90%, further preferably 60 to 88%.

The measurement method of each of the above-described characteristic values will be described in Examples.

The porous silica particles according to the present invention are preferably an aggregate of non-spherical particles including a plurality of primary particles (silica fine particles) which binds to each other. That is, particles that form the network structure of the porous particles include non-spherical particles. Such non-spherical particles are particles including a plurality of spherical primary particles which binds to each other. The average particle diameter (average secondary particle diameter $d_2$) of the non-spherical particles is preferably 50 to 500 nm. When the average particle diameter is within this range, the non-spherical particles are not densely packed. Therefore, a desired pore volume is likely to be obtained. The average secondary particle diameter is preferably 50 to 300 nm. Here, the average secondary particle diameter is obtained as an average value of the longest diameters of optional 100 particles selected through the observation of particles by a scanning electron microscopy.

The average particle diameter (average primary particle diameter $d_1$) of primary particles constituting the non-spherical particles is preferably 5 to 50 nm. When the average particle diameter is within this range, many fine pores are formed in the porous silica particles. At the same time, favorable disintegration properties are obtained. The average primary particle diameter is preferably 5 to 40 nm. It is noted that the average primary particle diameter $d_1$ is calculated according to equivalent sphere conversion equation "d=6000/(2.2×SA)." Here, SA is a specific surface area [m$^2$/g] of non-spherical particles calculated by a BET method based on nitrogen adsorption. 6000 is a conversion factor. The density of silica was assumed to be 2.2 g/cm$^3$.

The ratio ($d_2/d_1$) between the average secondary particle diameter $d_2$ and the average primary particle diameter $d_1$ is preferably 1.6 to 100. When the ratio is within this range, an appropriate three-dimensional network structure is formed.

Therefore, favorable disintegration properties are likely to be obtained. This ratio is more preferably 3 to 70, further preferably 4 to 40.

Examples of the non-spherical particles may include chain particles, fibrous particles, and non-spherical irregular-shaped particles, which include a plurality of connected primary particles. The shape of the primary particles may be either spherical (sphere or ellipsoid) or irregular. The non-spherical particles preferably include chain particles. Since chain particles are entangled with each other, porous silica particles having a three-dimensional network structure are likely to be obtained. Here, chain particles are either linear chain particles containing primary particles connected in such a manner as to extend in a specific direction or non-linear chain particles containing primary particles connected in such a manner as to extend in a plurality of directions (either two-dimensional or three-dimensional). For liner chain particles, the aspect ratio (major axis/minor axis) of particles is preferably 1.2 or more, more preferably 1.5 or more, further preferably 1.8 to 10. The average aspect ratio can be obtained as an average value of the aspect ratios of optional 100 particles measured using an electron micrograph.

On the other hand, non-liner chain particles are particles having a branched structure or a bent structure. It is preferable that such branched chain particles (branched particles) or bent chain particles (bent particles) exist. Practically, particles having both a branched structure and a bent structure also exist. An electron micrograph of an example of such particles is illustrated in FIG. 1. As described herein, such particles are also treated as a branched particle. The non-spherical particles include branched particles or bent particles. As a result, voids between non-spherical particles constituting the porous silica particles are enlarged. Accordingly, the porous silica particles are more likely to disintegrate. The total content of branched particles and bent particles contained in the porous silica particles is preferably 30% by mass or more, more preferably 50% by mass or more, further preferably 80% by mass or more.

Also, the porous silica particles preferably do not contain a binder component. Accordingly, more disintegrable particles can be obtained. Furthermore, the porous silica particles preferably do not contain impurities of alkali metal such as sodium and potassium and alkaline earth metal such as calcium and magnesium, which cause fusion (cause high strength). The content of each element is preferably 10 ppm, more preferably 5 ppm or less. Also, the porous silica particles preferably do not contain uranium and thorium, which are α-ray radioactive substance. The uranium content and the thorium content are each preferably 0.5 ppb or less, more preferably 0.3 ppb or less.

The above-described porous silica particles can be used as, for example, an abrasive for abrading industrial products or the like and a scrub material of cosmetics. When the porous silica particles are used as an abrasive, and applied with specific load, the silica particles disintegrate. Therefore, a substrate (object to be abraded) is unlikely to be scratched. Also, the average particle diameter of the non-spherical particles after disintegration and the average particle diameter of the primary particles are small. Therefore, fine asperities on the surface of a substrate can be abraded. The porous silica particles are particularly suitable for dry abrading as finishing. However, such silica particles can also be used for wet abrading. Specifically, the porous silica particles according to the present invention can be suitably used for abrading a semiconductor substrate, a display substrate, a metal plate, a glass plate, or the like. In practical abrading, the porous silica particles molded together with other components are used as a grindstone. Also, such porous silica particles are used in the form of powder as they are, or slurry containing the silica particles dispersed in liquid, together with a cloth or a pad.

When the porous silica particles, which have high porosity, are used in cosmetics, high absorption performance is exerted. Therefore, the porous silica particles according to the present invention can be used as an oil absorber of a foundation or a carrier of an active ingredient. The porous silica particles according to the present invention are easily disintegrable particles. Therefore, such porous silica particles are further suitable for a scrub material.

Next, the method of producing the porous silica particles will be described.

First, non-spherical silica particles are dispersed in water to prepare a dispersion of non-spherical particles (dispersion preparation step). The dispersion having a viscosity of 8 to 100 mPa·s maintained by shear force applied continuously or intermittently to the dispersion is poured in a spray dryer (drying step). That is, the viscosity of the dispersion poured in the spray dryer is within this range. At this time, the sodium content of solid matter obtained by drying this dispersion is 10 ppm or less. Then, spherical porous silica particles are granulated from the non-spherical particles in the dispersion, by the spray dryer. In this manner, dried spherical silica particles are obtained. Then, the spherical silica particles are calcined to obtain porous silica particles (calcination step).

Here, a step other than the above-described steps may be included. For example, a classification step may be included between the drying step and the calcination step. According to such a production method, the porous silica particles according to the present invention can be obtained.

Hereinafter, each step will be described in detail.

[Dispersion Preparation Step]

In this step, an aqueous dispersion is prepared with non-spherical silica particles as a raw material. Non-spherical silica particles can be obtained by, for example, binding spherical silica fine particles. This dispersion preferably contains 5 to 30 wt % of silica particles. Accordingly, granulation and drying can be efficiently performed. When the concentration is excessively low, granulation is unlikely to proceed in the drying step. Therefore, the particle size tends to decrease. When the concentration is excessively high, the particle size increases. Therefore, there is a risk that drying may be insufficient. Also, when the particle size is large, particles are dried before sufficiently firmed. Therefore, the mechanical strength of the particles comes to be excessively low. As a result, there is a risk that particles may be damaged during production. Especially, the porous silica particles according to the present invention are easily disintegrable. Therefore, the silica concentration of the dispersion is important.

This concentration is more preferably 10 to 20 wt %, further preferably 10 to 15 wt %. Within this concentration range, high viscosity is achieved at low shear rate. On the other hand, low viscosity is achieved at high shear rate. In brief, a dispersion having non-Newtonian properties can be prepared. This non-Newtonian dispersion is spray-dried in a state in which the viscosity is lowered by high shear rate. The dispersion having favorable fluidity is sprayed from a nozzle. The shear rate in the sprayed droplets is lowered. As a result, the droplets increase in viscosity (have an aggregation structure). Therefore, neatly spherical porous silica particles are obtained.

Also, for reducing the content of each of elements such as sodium contained in the porous silica particles to 10 ppm or less, the dispersion of non-spherical particles preferably does not contain these elements as impurities. Therefore, the content of each element in solid matter obtained by drying the dispersion is preferably 10 ppm or less.

The dispersion of non-spherical particles may contain alcohol such as methanol and ethanol. The contained alcohol can prevent the contraction during drying. As a result, particles having high porosity can be obtained. As the non-spherical particles, chain silica sol prepared by a wet method or fumed silica prepared by a dry method can be used. Specific examples thereof may include AEROSIL-90, AEROSIL-130, and AEROSIL-200 (manufacture by Nippon Aerosil Co., Ltd.), as well as silica particles produced by the production method disclosed in JP-A-2003-133267, JP-A-2013-032276, or the like.

It is noted that in this step, a gel of an inorganic oxide (for example, an inorganic oxide disclosed in PATENT LITERATURE 2) is preferably not added to the dispersion. Also, a small (for example, 3 nm or less) monomer capable of functioning as a binder and elements such as sodium which cause fusion are preferably removed from the dispersion before the subsequent drying step (that is, before granulation). Examples of the removal measure may include a treatment with ion exchange resin, a treatment with an ion exchange film, ultrafiltration, separation by a centrifuge, and decantation. It is noted that the removal treatment may be performed not only before drying but also after the drying step. Alternatively, the removal treatment before drying may be replaced with the removal treatment after the drying step. Examples of the removal method after the drying step may include a method of performing a treatment similar to that before drying to the dried particles suspended in water and a method of rinsing a filter with warm water.

[Drying Step]

In the drying step, the dispersion of non-spherical particles poured in the spray dryer is granulated and dried. (As described herein, the particles obtained in this step is referred to as dried silica particles.) At this time, the viscosity of the dispersion poured in the spray dryer needs to be maintained within a certain range (8 to 100 mPa·s). This viscosity is preferably as low as possible. This is an important point of the production method. The viscosity of the dispersion is more preferably 10 to 90 mPa·s, further preferably 10 to 80 mPa·s.

The dispersion of non-spherical particles usually has thixotropic properties. Therefore, the viscosity is controlled within this range by shear force applied continuously or intermittently to the dispersion. Furthermore, the viscosity change of the dispersion is preferably small. Specifically, the viscosity change from the initiation of pouring of the dispersion in a spray dryer to the termination of the pouring is preferably controlled within ±30 mPa·s. For example, when the viscosity of a dispersion at the initiation of pouring of the dispersion in a spray dryer is 50 mPa·s, the dispersion is poured in the spray dryer while the viscosity is maintained at 20 to 80 mPa·s. When the viscosity of a dispersion at the initiation of pouring of the dispersion in a spray dryer is 80 mPa·s, the dispersion is poured in the spray dryer while the viscosity is maintained at 50 to 100 mPa·s so as not to exceed 100 mPa·s. That is, shear force is continuously or intermittently applied immediately before the pouring in the spray dryer, such that the viscosity is within the above-described range. The range of the viscosity change is more preferably within ±25 mPa·s, further preferably within ±20 mPa·s.

In this regard, according to PATENT LITERATURE 3, the viscosity of a slurry is adjusted by continuous grinding during spray drying. That is, continuous or intermittent shear force is not applied. Therefore, even if the viscosity is initially within the above-described range, the viscosity becomes outside this range as time elapses. As a result, the porous silica particles according to the present invention cannot be obtained.

It is noted that constant viscosity leads to constant droplet size. As a result, a sharp particle diameter distribution can be obtained. Also, the viscosity change is adjusted within the above-described range. Accordingly, reproducibility of the particle diameter distribution improves. Therefore, porous silica particles having an equivalent particle diameter distribution can be stably produced. Also, the dispersion is poured in a spray dryer while the viscosity is maintained within a certain range. Accordingly, a pipe for supplying the dispersion to a spray dryer, a nozzle of the spray dryer, or the like can be prevented from being clogged with the dispersion. As a result, production efficiency improves.

While shear force is applied to the dispersion, non-spherical particles are preferably not ground into primary particles. When non-spherical particles are ground into primary particles, the primary particles are densely packed. Accordingly, the pore volume of dried silica particles obtained by granulation becomes small. As a result, the average compression strength of the porous silica particles sometimes exceeds 1.0 kgf/mm$^2$. Also, when non-spherical particles are ground into primary particles, the specific surface area of particles contained in the dispersion increases. Furthermore, the number of hydroxyl groups on the particle surface accordingly increases. This strengthens bonds among primary particles. As a result, the average compression strength of the porous silica particles sometimes exceeds 1.0 kgf/mm$^2$.

Examples of an apparatus for applying shear force to the dispersion may include a dispermill, ball mill, homogenizer, vibration mill, and attritor. Using these apparatuses, conditions (rotation speed, grinding medium, and the like) for applying shear force can be set as necessary, such that the viscosity of the dispersion is maintained, and non-spherical particles are not ground into primary particles. Here, it is not preferable that the dispersion be contaminated with sodium derived from an apparatus for applying shear force. For example, when shear force is applied by an apparatus having a glass grinding medium, the dispersion is contaminated with fragments of the grinding medium. Alternatively, sodium contained in the grinding medium is eluted. Thus, the sodium content of the dispersion comes to increase. As a result, non-spherical particles constituting the porous silica particles are likely to be fused to each other. As a result, the average compression strength sometimes exceeds 1.0 kgf/mm$^2$. Therefore, the sodium content of solid matter obtained by drying the dispersion applied with shear force is preferably 10 ppm or less, more preferably 5 ppm or less.

Also, the temperature of the dispersion when poured in a spray dryer is preferably 10 to 30° C., more preferably 15 to 25° C. That is, liquid temperature also influences viscosity. Therefore, the viscosity is desirably always maintained within the above-described range.

In the drying step, drying is preferably performed until the water content of dried silica particles reaches 1 to 10 wt %. This can prevent the disintegration of particles in the drying step due to rapid drying and the generation of particles that are not spherical. Also, the fusion among particles in the calcination step can be effectively prevented. In this manner, the dried silica particles can have a shape that is further closer to a complete sphere by spray drying in the drying step.

As a method for spray drying, a rotating disk method, pressure nozzle method, two-fluid nozzle method, or any known method can be adopted. Especially, a two-fluid nozzle method is preferable. The drying temperature, as outlet hot air temperature, in the drying step is preferably 30 to 150° C., more preferably 40 to 100° C. Drying within this range achieves sufficient drying. At the same time, the coalescence and fusion among particles in the calcination step can be reduced.

[Calcination Step]

Calcination is usually performed in air atmosphere. The calcination temperature is preferably 250 to 800° C., more preferably 300 to 600° C., further preferably 310 to 410° C. Calcining within this range reduces moisture remaining in the porous silica particles. This improves the stability in quality. Also, heat-caused fusion among non-spherical particles constituting the porous silica particles can be prevented. That is, the strength can be prevented from increasing.

[Classification step]

A classification step may be included between the drying step and the calcination step. The silica particles produced through the above-described dispersion preparation step and drying step never disintegrate in the classification step. In the classification step, coarse particles are removed. Specifically, coarse particles having a particle diameter that is equal to or more than four times the average particle diameter are removed. The ratio of the coarse particles having a particle diameter that is equal to or more than four times the average particle diameter is set to be preferably 5 wt % or less, more preferably 2 wt % or less. Here, as a classification apparatus, Doreserekku manufactured by Donaldson Company, Inc., Spin Air Sieve manufactured by Seishin Enterprise Co., Ltd., Aerofine Classifier manufactured by Nisshin Engineering Inc., HIPREC classifier manufactured by Powder Systems Co., Ltd., Twin Turboplex manufactured by Hosokawa Micron Corporation, or the like can be used.

EXAMPLES

Hereinafter, examples of the present invention will be specifically described.

Example 1

Into a tank having an inner capacity of 150 L in which 60 L of water has been poured, 8.6 kg of AEROSIL-90G (Nippon Aerosil Co., Ltd.) was gradually added under stirring, and thoroughly mixed. Accordingly, a dispersion of non-spherical particles (silica particle concentration 12.5 wt %) was obtained. At this time, the viscosity of the dispersion was 136 mPa·s. Through a dispermill (manufactured by Hosokawa Micron Corporation), this dispersion was supplied into a facing two-fluid nozzle of a spray dryer. Spray drying was performed under the conditions of throughput 60 L/Hr, air/liquid ratio=2,100, air flow velocity Mach 1.1, drying atmosphere temperature 120° C., and humidity 7.2 vol %. In this manner, dried silica particles (moisture content 2 wt %) were produced. The viscosity of the dispersion at the initiation of pouring of the dispersion in the spray dryer was 72 mPa·s. At the termination of the pouring in the spray dryer, the viscosity of the remaining dispersion was 67 mPa·s. Also, 50 g of this remaining dispersion was taken, and dried at 110° C. for 5 hours to obtain solid matter. The sodium content of this solid matter was 5 ppm or less. From the dried silica particles, coarse particles were removed. Thereafter, the silica particles were left to stand at 400° C. for 3 hours. Accordingly, porous silica particles were obtained. It is noted that AEROSIL-90G used as a raw material is chain particles including branched particles and bent particles. The average secondary particle diameter of the chain particles was 200 nm. The average primary particle diameter thereof was 30 nm.

The obtained porous silica particles were measured for average particle diameter, pore volume, mode of a pore diameter, average shape factor, average compression strength, sodium content, uranium content, thorium content, specific surface area, pore volume rate, and porosity. The results are illustrated in Table 1. The measurement method of each characteristic value is as follows.

(1) Average Particle Diameter (D)

Using a particle size distribution measuring device (Multisizer 3) manufactured by Beckman Coulter, Inc., a particle size distribution was measured. From number statistics as the measurement result, an average particle diameter (D) was calculated.

(2) Pore Volume (V) and Mode of Pore Diameter

A pore volume and a mode of a pore diameter were measured by a mercury intrusion method, using PM-33P-GT manufactured by QUANTACHROME Co. In this mercury intrusion method, mercury is press-fitted into pores. The relationship between the pressure applied and the volume of mercury intruded into pores is measured. The relationship between a pressure (P) and a pore diameter ($D_P$) is derived from the following Washburn formula.

$$D_P = -4\gamma \cos \theta / P$$

($D_P$; pore diameter, $\gamma$; surface tension of mercury, $\theta$; contact angle between mercury and pore wall surface, P; pressure)

Based on the relationship between pressure and pore diameter and the volume of mercury intruded, a pore distribution is obtained.

First, the pore diameter distribution at 5 nm to 10 μm was checked. It was considered that the pore diameter of more than 100 nm mainly corresponds to the volume of voids among the porous silica particles. The pore diameter of 100 nm or less was regarded as corresponding to pores inside the porous silica particles. In this manner, the pore volume (V) was calculated. Similarly, the mode of a pore diameter is a pore diameter corresponding to a main peak obtained by differentiating the integrated value of the pore volume with the pore diameter of 100 nm or less.

(3) Average Shape Factor

An electron micrograph of a powder sample of the porous silica particles in which single particles are dispersed so as not to overlap each other was taken at a magnification of 2000× using a scanning electron microscope. The image of this micrograph was analyzed by an image analyzer manufactured by Shimadzu Corporation. The area and circumference of the projected surface of each of single particles were measured. An equivalent diameter calculated on the assumption that this area is the area of a perfect circle was defined as HD. An equivalent diameter calculated on the assumption that this circumference is the circumference of a perfect circle was defined as Hd. A calculated ratio (HD/Hd) between these diameters was defined as a shape factor. The average value of the calculated shape factors of 100 particles was defined as an average shape factor.

(4) Average Compression Strength

A compression strength was measured using Micro Compression Tester (MCT-W500) manufactured by Shimadzu Corporation. Particles as a sample were compressed to add load (weight), and a weight applied when the sample was broken was measured. This weight was defined as a compression strength. The average of the measured values of 5 samples was defined as an average compression strength.

(5) Sodium Content, Uranium Content, and Thorium Content

To the solid matter obtained by drying the dispersion or the porous silica particles, sulfuric acid and hydrofluoric acid were added. Heating was performed until white smoke of sulfuric acid occurred. Nitric acid and water were added to perform warming and dissolution. After dilution into a certain amount, the sodium content, relative to the $SiO_2$-equivalent content (mass) of the solid matter obtained by drying the dispersion, was calculated using an ICP mass spectrometer. Also, the sodium content, uranium content, and thorium content, relative to the $SiO_2$-equivalent content (mass) of the porous silica particles, were each calculated.

(6) Specific Surface Area

A specific surface area was calculated by a BET method based on nitrogen adsorption.

(7) Pore Volume Rate

A pore volume rate was calculated from the total pore volume (V±25%) of pores having a diameter within ±25% of the above-described mode of a pore diameter and the pore volume (V) of the porous silica particles, according to the following formula.

Pore volume rate (%)=$V_{\pm 25\%}/V \times 100$ (8) Porosity

A porosity was calculated from the pore volume (V) calculated by a mercury intrusion method, on the assumption that silica has a density of 2.2 g/cm³(=0.4545 cm³/g), according to the following formula.

Porosity (%)=$V/(V+0.4545) \times 100$

Next, an abrasive grindstone containing as abrasive grains the porous silica particles produced in the present example was prepared. That is, 100 parts by weight of the porous silica particles and 100 parts by weight of rubber particles (NBR cured rubber, average particle diameter 120 μm) as a matrix were uniformly mixed. The obtained mixture was compression-molded into a ring shape at a pressure of 100 kgf/cm². Thereafter, compression heating was performed at 150° C. for 10 minutes to obtain an abrasive grindstone having a shape of outer diameter 300 mm, inner diameter 100 mm, and thickness 10 mm. This abrasive grindstone was subjected to the following scratch evaluation. The result is illustrated in Table 1.

(9) Scratch Evaluation

By bringing a glass substrate into contact with the planer part of an abrasive grindstone adhered to a base plate, the glass substrate was abraded under the following abrasive conditions. Then, the abraded surface of the glass substrate was observed using an ultrafine defect visualization macro device (MICROMAX manufactured by Vision Psytech Co.). Scratches were evaluated in accordance with the following evaluation criteria.

Abrasive Conditions
  Grindstone rotational speed: 30 m/sec (peripheral portion)
  Grindstone pressure: 150 g/cm²
  Abrasive liquid: water
  Work: glass substrate (borosilicate glass)
  Abrasive time: 2 minutes 30 seconds Evaluation Criteria of Scratches
  Surface is smooth. Scratches are hardly observed: Good
  Surface is smooth. Scratches are slightly observed: Fair
  Surface is not smooth. Scratches are observed: Poor Example 2

Figure 2:
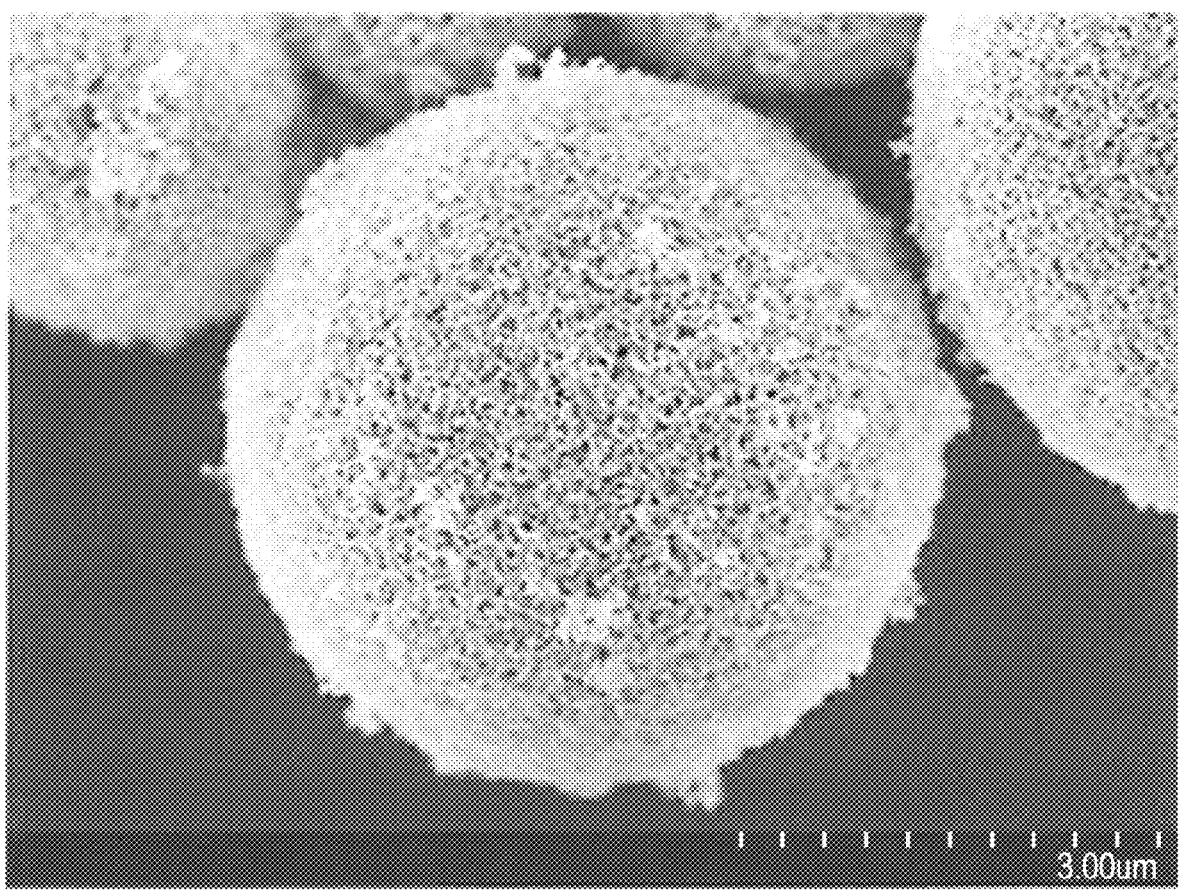
FIG. 2 is an electron micrograph illustrating appearances of porous silica particles.

Porous silica particles were produced by the same method as Example 1, except that AEROSIL-130 was used instead of AEROSIL-90G. The viscosity of a dispersion before passing through a dispermill was 383 mPa·s. At the initiation of pouring of the dispersion which had passed through the dispermill, the viscosity of the dispersion was 54 mPa·s. At the termination of the pouring in a spray dryer, the viscosity of the remaining dispersion was 37 mPa·s. Also, the sodium content of solid matter obtained by drying this remaining dispersion was 5 ppm or less. The obtained porous silica particles were measured by the same method as Example 1. Also, an abrasive grindstone prepared by the same method as Example 1 using the porous silica particles of the present example was subjected to scratch evaluation. The result is illustrated in Table 1. Also, an electron micrograph of the obtained porous silica particles is illustrated in FIG. 2. It is noted that AEROSIL-130 used as a raw material was chain particles including branched particles and bent particles. The average secondary particle diameter of the chain particles was 180 nm. The average primary particle diameter thereof was 21 nm.

Example 3

Porous silica particles were produced by the same method as Example 1, except that AEROSIL-380 was used instead of AEROSIL-90G. The viscosity of a dispersion before passing through a dispermill was 200 mPa·s. At the initiation of pouring of the dispersion which had passed through the dispermill, the viscosity of the dispersion was 30 mPa·s. At the termination of the pouring in a spray dryer, the viscosity of the remaining dispersion was 15 mPa·s. Also, the sodium content of solid matter obtained by drying this remaining dispersion was 5 ppm or less. The obtained porous silica particles were measured by the same method as Example 1. Also, an abrasive grindstone prepared by the same method as Example 1 using the porous silica particles of the present example was subjected to scratch evaluation. The result is illustrated in Table 1. It is noted that AEROSIL-380 used as a raw material was chain particles including branched particles and bent particles. The average secondary particle diameter of the chain particles was 150 nm. The average primary particle diameter thereof was 7 nm.

Comparative Example 1

Into a tank having an inner capacity of 150 L in which 60 L of water was added, 40 kg of AEROSIL-200 (Nippon Aerosil Co., Ltd.) was gradually added under stirring, and thoroughly mixed. Accordingly, a slurry (silica particle concentration 40 wt %) was obtained. Dried silica particles were produced by the same method as Example 1, except that the obtained slurry did not pass through a dispermill. The viscosity of the slurry at the initiation of pouring of a dispersion in a spray dryer was 1200 mPa·s. At the termination of the pouring in the spray dryer, the viscosity of the remaining slurry was 2600 mPa·s. Also, the sodium content of solid matter obtained by drying this remaining dispersion was 5 ppm or less. This dried silica particles were left to stand under calcination at 600° C. for 3 hours to obtain calcined silica particles. It is noted that AEROSIL-200 used as a raw material was chain particles including branched particles and bent particles. The average secondary particle diameter of the chain particles was 170 nm. The average primary particle diameter thereof was 14 nm.

ticles were measured by the same method as Example 1. Also, an abrasive grindstone prepared by the same method as Example 1 using such calcined silica particles was subjected to scratch evaluation. The result is illustrated in Table 1.

TABLE 1

| Raw material | Example 1 AEROSIL-90G | Example 2 AEROSIL-130 | Example 3 AEROSIL-380 | Comparative Example 1 AEROSIL-200 | Comparative Example 2 AEROSIL-380 | Comparative Example 3 AEROSIL-380 |
|---|---|---|---|---|---|---|
| Average particle diameter (D) μm | 3.4 | 3.8 | 4.3 | 5.3 | 5.5 | 4.5 |
| Pore volume (V) cm$^3$/g | 1.89 | 1.95 | 1.43 | — | 1.32 | 1.45 |
| Mode of pore diameter nm | 41 | 24 | 12 | — | 12 | 12 |
| Average shape factor | 0.88 | 0.90 | 0.90 | 0.47 | 0.73 | 0.89 |
| Average compression strength kgf/mm$^2$ | 0.18 | 0.21 | 0.37 | 0.07 | 0.30 | 3.0 |
| Sodium content ppm | 5 or less | 5 or less | 5 or less | 5 or less | 5 or less | 20 |
| Uranium content ppb | 0.3 or less | 0.3 or less | 0.3 or less | 0.3 or less | 0.3 or less | 1.1 |
| Thorium content ppb | 0.3 or less | 0.3 or less | 0.3 or less | 0.3 or less | 0.3 or less | 0.9 |
| Specific surface area m$^2$/g | 85 | 140 | 350 | 215 | 350 | 330 |
| Pore volume rate % | 66 | 53 | 43 | — | 32 | 35 |
| Porosity % | 81 | 81 | 76 | — | 74 | 70 |
| Scratch evaluation performed by preparing abrasive grindstone | Good | Good | Good | — | Poor | Poor |

The obtained calcined silica particles were measured by the same method as Example 1. The result is illustrated in Table 1. It is noted that since the calcined silica particles were extremely easily disintegrable, measurement of a pore volume by a mercury intrusion method, or the like, could not be accurately performed. Therefore, the pore volume, mode of a pore diameter, pore volume rate, and porosity could not be calculated. In addition, an abrasive grindstone could not be prepared.

Comparative Example 2

Calcined silica particles were produced by the same method as Example 3, except that a dispersion of non-spherical particles did not pass through a dispermill. It is noted that the viscosity of the dispersion at the initiation of pouring of the dispersion in a spray dryer was 200 mPa·s. At the termination of the pouring in the spray dryer, the viscosity of the remaining dispersion was 350 mPa·s. Also, the sodium content of solid matter obtained by drying this remaining dispersion was 5 ppm or less. The obtained calcined silica particles were measured by the same method as Example 1. Also, an abrasive grindstone prepared by the same method as Example 1 using such calcined silica particles was subjected to scratch evaluation. The result is illustrated in Table 1.

Comparative Example 3

Calcined silica particles were produced by the same method as Example 3, except that, as an apparatus for applying shearing, a sand mill having a glass grinding medium was used instead of a dispermill. It is noted the viscosity of the dispersion at the initiation of pouring of a dispersion in a spray dryer was 35 mPa·s. At the termination of the pouring in the spray dryer, the viscosity of the remaining dispersion was 30 mPa·s. Also, the sodium content of solid matter obtained by drying this remaining dispersion was 20 ppm. The obtained calcined silica par-

What is claimed is:

1. Porous silica particles having a network structure, satisfying (i) to (vi) below:
   (i) the porous silica particles have an average particle diameter [μm] of 0.5 to 50,
   (ii) the porous silica particles have a pore volume [cm$^3$/g] of 0.5 to 5.0,
   (iii) the porous silica particles have a mode of a pore diameter [nm] of 2 to 50,
   (iv) the porous silica particles have an average shape factor of 0.8 to 1.0,
   (v) the porous silica particles have an average compression strength [kgf/mm$^2$] of 0.1 to less than 1.0, and
   (vi) the porous silica particles have a sodium content of 10 ppm or less, wherein a pore volume rate calculated from a total pore volume ($V_{\pm 25\%}$) of pores having a pore diameter within ±25% of the mode and the pore volume (V), according to formula (1), is 40% or more:

$$\text{pore volume rate (\%)} = (V_{\pm 25\%}/V) \times 100 \qquad (1).$$

2. The porous silica particles according to claim 1, wherein the porous silica particles have a specific surface area of 30 to 400 m$^2$/g.

3. The porous silica particles according to claim 1, wherein
   the porous silica particles that form the network structure include non-spherical particles,
   wherein the non-spherical particles include silica fine particles having an average particle diameter of 5 to 50 nm which bind to each other, and
   wherein the non-spherical particles have an average particle diameter of 50 to 500 nm.

4. The porous silica particles according to claim 3, wherein a ratio ($d_2/d_1$) between an average particle diameter ($d_2$) of the non-spherical particles and an average particle diameter ($d_1$) of the silica fine particles is 1.6 to 100.

* * * * *